United States Patent
Lu et al.

(10) Patent No.: US 11,665,255 B2
(45) Date of Patent: May 30, 2023

(54) DATA PUSH METHOD, DATA PUSH SYSTEM, AND COMPUTER-PROGRAM PRODUCT

(71) Applicants: K-Tronics (Suzhou) Technology Co., Ltd., Jiangsu (CN); BOE TECHNOLOGY GROUP CO., LTD., Beijing (CN)

(72) Inventors: Lixia Lu, Beijing (CN); Tengteng Li, Beijing (CN); Yutao Yan, Beijing (CN); Min Chen, Beijing (CN); Renfeng Duan, Beijing (CN)

(73) Assignees: K-Tronics (Suzhou) TECHNOLOGY CO., LTD., Jiangsu (CN); BOE Technology Group Co., Ltd., Beijing (CN)

( * ) Notice: Subject to any disclaimer, the term of this patent is extended or adjusted under 35 U.S.C. 154(b) by 128 days.

(21) Appl. No.: 17/311,347

(22) PCT Filed: Sep. 9, 2020

(86) PCT No.: PCT/CN2020/114186
§ 371 (c)(1),
(2) Date: Jun. 7, 2021

(87) PCT Pub. No.: WO2022/051928
PCT Pub. Date: Mar. 17, 2022

(65) Prior Publication Data
US 2022/0321677 A1    Oct. 6, 2022

(51) Int. Cl.
*H04L 67/55*    (2022.01)
*H04W 4/60*    (2018.01)
(Continued)

(52) U.S. Cl.
CPC .............. *H04L 67/55* (2022.05); *H04L 67/10* (2013.01); *H04L 67/562* (2022.05); *H04W 4/60* (2018.02)

(58) Field of Classification Search
CPC ....... H04L 67/55; H04L 67/562; H04L 67/10; H04W 4/60
See application file for complete search history.

(56) References Cited

U.S. PATENT DOCUMENTS

| 10,666,712 B1* | 5/2020 | Dandekar | ............... H04L 67/10 |
| 2016/0028780 A1* | 1/2016 | Verzano | .................. H04L 67/02 |
| | | | 709/204 |
| 2019/0372838 A1* | 12/2019 | Travostino | .......... H04L 41/0813 |

FOREIGN PATENT DOCUMENTS

| CN | 104601665 A | 5/2015 |
| CN | 109151043 A | 1/2019 |

(Continued)

OTHER PUBLICATIONS

International Search Report & Written Opinion dated May 27, 2021, regarding PCT/CN2020/114186.

*Primary Examiner* — Suraj M Joshi
(74) *Attorney, Agent, or Firm* — Intellectual Valley Law, P.C.

(57) ABSTRACT

A data push method is provided. The data push method include publishing data by at least one of a plurality of data publishing terminals; communicating an intelligent gateway with the plurality of data publishing terminals to monitor data publishing status of the plurality of data publishing terminals; communicating the intelligent gateway with a cloud-based data distribution broker configured to implement a publish-and-subscribe protocol via internet to transmit published data to the cloud-based data distribution broker via the publish-and-subscribe protocol; and performing a controllable operation by one or more of a plurality of (Continued)

device terminals based on the data transmitted to the one or more of a plurality of device terminals. The intelligent gateway is configured to transmit the data published by the plurality of data publishing terminals to a message proxy server via the publish-and-subscribe protocol. A mobile terminal is configured to publish the data in real time.

20 Claims, 7 Drawing Sheets

(51) Int. Cl.
*H04L 67/562* (2022.01)
*H04L 67/10* (2022.01)

(56) References Cited

FOREIGN PATENT DOCUMENTS

| | | |
|---|---|---|
| CN | 109245295 A | 1/2019 |
| CN | 110138844 A | 8/2019 |
| CN | 110703617 A | 1/2020 |

* cited by examiner

DATA PUSH METHOD, DATA PUSH SYSTEM, AND COMPUTER-PROGRAM PRODUCT

CROSS-REFERENCE TO RELATED APPLICATION

This application is a national stage application under 35 U.S.C. § 371 of International Application No. PCT/CN2020/114186, filed Sep. 9, 2020, the contents of which are incorporated by reference in the entirety.

TECHNICAL FIELD

The present invention relates to internet-of-things technology, more particularly, to a data push method, a data push system, and a computer-program product.

BACKGROUND

With the recent development of interactive information processing technology, multimedia information dissemination systems have emerged and gradually replaced the manual posting and update of advertisements. One of the issues with the manual posting and update of advertisements is the delay and information loss when the terminal devices are in a poor network environment.

SUMMARY

In one aspect, the present disclosure provides a data push method, comprising publishing data by at least one of a plurality of data publishing terminals; communicating an intelligent gateway with the plurality of data publishing terminals to monitor data publishing status of the plurality of data publishing terminals; communicating the intelligent gateway with a cloud-based data distribution broker configured to implement a publish-and-subscribe protocol via internet to transmit data published by the plurality of data publishing terminals to the cloud-based data distribution broker via the publish-and-subscribe protocol; and performing a controllable operation by one or more of a plurality of device terminals based on the data transmitted to the one or more of a plurality of device terminals; wherein the cloud-based data distribution broker comprises a message proxy server, a background management system, a database server, an application server, and an object storage server; the intelligent gateway is configured to transmit the data published by the plurality of data publishing terminals to the message proxy server via the publish-and-subscribe protocol; the plurality of data publishing terminals comprise a mobile terminal and a stationary terminal; and the mobile terminal is configured to publish the data in real time.

Optionally, the data push method further comprises transmitting the data to the intelligent gateway; determining whether the data is published by the mobile terminal; based on a determination that the data is published by the mobile terminal, determining whether the mobile terminal and a selected device terminal of the plurality of device terminals are connected to a same local area network; based on a determination that the mobile terminal and the selected device terminal are connected to the same local area network, transmitting the data from the mobile terminal to the selected device terminal via the same local area network.

Optionally, the data push method further comprises transmitting the data to the intelligent gateway; determining whether the data is published by the mobile terminal; based on a determination that the data is published by the mobile terminal, determining whether the mobile terminal and a selected device terminal of the plurality of device terminals are connected to a same local area network; based on a determination that the mobile terminal and the selected device terminal are not connected to the same local area network, transmitting the data from the intelligent gateway to the message proxy server via the publish-and-subscribe protocol; and pushing the data to the selected device terminal.

Optionally, the data push method further comprises transmitting the data to the intelligent gateway; determining whether the data is published by the mobile terminal; based on a determination that the data is published by the mobile terminal, determining whether the mobile terminal and the plurality of device terminals are connected to a same local area network; based on a determination that the mobile terminal and a first selected device terminal of the plurality of device terminals are connected to the same local area network, transmitting the data from the mobile terminal to the first selected device terminal via the same local area network; based on a determination that the mobile terminal and a second selected device terminal of the plurality of device terminals are not connected to the same local area network, transmitting the data from the intelligent gateway to the message proxy server via the publish-and-subscribe protocol; and pushing the data to the second selected device terminal.

Optionally, the data push method further comprises transmitting the data to the intelligent gateway; determining whether the data is published by the stationary terminal; based on a determination that the data is published by the stationary terminal, transmitting the data from the intelligent gateway to the message proxy server via the publish-and-subscribe protocol; and pushing the data to a selected device terminal of the plurality of device terminals.

Optionally, the publish-and-subscribe protocol is a Message Queue Telemetry Transport (MQTT) publish-and-subscribe protocol; and the message proxy server is a MQTT message proxy server.

In another aspect, the present disclosure provides a data push system, comprising a cloud-based data distribution broker configured to implement a publish-and-subscribe protocol; a plurality of data publishing terminals configured to publish data; an intelligent gateway configured to communicate with the plurality of data publishing terminals and monitor data publishing status of the plurality of data publishing terminals, and configured to communicate with the cloud-based data distribution broker via internet, to transmit data published by the plurality of data publishing terminals to the cloud-based data distribution broker via the publish-and-subscribe protocol; and a plurality of device terminals configured to perform a controllable operation based on the data transmitted to one or more of a plurality of device terminals; wherein the cloud-based data distribution broker comprises a message proxy server, a background management system, a database server, an application server, and an object storage server; the intelligent gateway is configured to transmit the data published by the plurality of data publishing terminals to the message proxy server via the publish-and-subscribe protocol; the plurality of data publishing terminals comprise a mobile terminal and a stationary terminal; and the mobile terminal is configured to publish the data in real time.

Optionally, the intelligent gateway is configured to determine whether a data received by the intelligent gateway is published by the mobile terminal; and determine, based on a determination that the data is published by the mobile terminal, whether the mobile terminal and a selected device terminal of the plurality of device terminals are connected to a same local area network; wherein the mobile terminal is configured to, based on a determination that the mobile terminal and the selected device terminal are connected to the same local area network, transmit the data from the mobile terminal to the selected device terminal via the same local area network.

Optionally, the intelligent gateway is configured to determine whether a data received by the intelligent gateway is published by the mobile terminal; determine, based on a determination that the data is published by the mobile terminal, whether the mobile terminal and a selected device terminal of the plurality of device terminals are connected to a same local area network; and transmit, based on a determination that the mobile terminal and the selected device terminal are not connected to the same local area network, the data from the intelligent gateway to the message proxy server via the publish-and-subscribe protocol; wherein the cloud-based data distribution broker is configured to push the data to the selected device terminal.

Optionally, the intelligent gateway is configured to determine whether a data received by the intelligent gateway is published by the mobile terminal; and determine, based on a determination that the data is published by the mobile terminal, whether the mobile terminal and the plurality of device terminals are connected to a same local area network; wherein the mobile terminal is configured to, based on a determination that the mobile terminal and a first selected device terminal of the plurality of device terminals are connected to the same local area network, transmit the data from the mobile terminal to the first selected device terminal via the same local area network; wherein the intelligent gateway is further configured to transmit, based on a determination that the mobile terminal and a second selected device terminal of the plurality of device terminals are not connected to the same local area network, the data from the intelligent gateway to the message proxy server via the publish-and-subscribe protocol; wherein the cloud-based data distribution broker is configured to push the data to the second selected device terminal.

Optionally, the intelligent gateway is configured to determine whether a data received by the intelligent gateway is published by the stationary terminal; and transmit, based on a determination that the data is published by the stationary terminal, the data from the intelligent gateway to the message proxy server via the publish-and-subscribe protocol; wherein the cloud-based data distribution broker is configured to push the data to a selected device terminal.

Optionally, the publish-and-subscribe protocol is a Message Queue Telemetry Transport (MQTT) publish-and-subscribe protocol; and the message proxy server is a MQTT message proxy server.

In another aspect, the present disclosure provides a computer-program product comprising a non-transitory tangible computer-readable medium having computer-readable instructions thereon, the computer-readable instructions being executable by a processor to cause the processor to perform causing an intelligent gateway in communication with a plurality of data publishing terminals to monitor data publishing status of the plurality of data publishing terminals, the intelligent gateway in communication with a cloud-based data distribution broker configured to implement a publish-and-subscribe protocol; and causing the intelligent gateway to transmit via internet data published by at least one of the plurality of data publishing terminals to the cloud-based data distribution broker via the publish-and-subscribe protocol; wherein the cloud-based data distribution broker comprises a message proxy server, a background management system, a database server, an application server, and an object storage server; the intelligent gateway is configured to transmit the data published by the at least one of the plurality of data publishing terminals to the message proxy server via the publish-and-subscribe protocol; the plurality of data publishing terminals comprise a mobile terminal and a stationary terminal; and the mobile terminal is configured to publish the data in real time.

Optionally, the computer-readable instructions being executable by the processor to cause the processor to further perform determining whether the data received by the intelligent gateway is published by the mobile terminal; based on a determination that the data is published by the mobile terminal, determining whether the mobile terminal and a selected device terminal of a plurality of device terminals are connected to a same local area network; and based on a determination that the mobile terminal and the selected device terminal are connected to the same local area network, causing the mobile terminal to transmit the data to the selected device terminal via the same local area network.

Optionally, the computer-readable instructions being executable by the processor to cause the processor to further perform determining whether the data received by the intelligent gateway is published by the mobile terminal; based on a determination that the data is published by the mobile terminal, determining whether the mobile terminal and a selected device terminal of a plurality of device terminals are connected to a same local area network; based on a determination that the mobile terminal and the selected device terminal are not connected to the same local area network, transmitting the data from the intelligent gateway to the message proxy server via the publish-and-subscribe protocol; and pushing the data to the selected device terminal.

Optionally, the computer-readable instructions being executable by the processor to cause the processor to further perform determining whether the data received by the intelligent gateway is published by the mobile terminal; based on a determination that the data is published by the mobile terminal, determining whether the mobile terminal and a plurality of device terminals are connected to a same local area network; based on a determination that the mobile terminal and a first selected device terminal of the plurality of device terminals are connected to the same local area network, transmitting the data from the mobile terminal to the first selected device terminal via the same local area network; based on a determination that the mobile terminal and a second selected device terminal of the plurality of device terminals are not connected to the same local area network, transmitting the data from the intelligent gateway to the message proxy server via the publish-and-subscribe protocol; and pushing the data to the second selected device terminal.

Optionally, the computer-readable instructions being executable by the processor to cause the processor to further perform determining whether the data received by the intelligent gateway is published by the stationary terminal; based on a determination that the data is published by the stationary terminal, transmitting the data from the intelligent gateway to the message proxy server via the publish-and-subscribe protocol; and pushing the data to a selected device terminal of a plurality of device terminals.

Optionally, the publish-and-subscribe protocol is a Message Queue Telemetry Transport (MQTT) publish-and-subscribe protocol; and the message proxy server is a MQTT message proxy server.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a data push method, a data push system, and a computer-program product that substantially obviate one or more of the problems due to limitations and disadvantages of the related art. In one aspect, the present disclosure provides a data push method. In some embodiments, the data push method includes publishing data by at least one of a plurality of data publishing terminals; communicating an intelligent gateway with the plurality of data publishing terminals to monitor data publishing status of the plurality of data publishing terminals; communicating the intelligent gateway with a cloud-based data distribution broker configured to implement) publish-and-subscribe protocol via internet to transmit data published by the plurality of data publishing terminals to the cloud-based data distribution broker via the publish-and-subscribe protocol; and performing a controllable operation by one or more of a plurality of device terminals based on the data transmitted to the one or more of a plurality of device terminals. Optionally, the cloud-based data distribution broker includes a message proxy server, a background management system, a database server, an application server, and an object storage server. Optionally, the intelligent gateway is configured to transmit the data published by the plurality of data publishing terminals to the message proxy server via the publish-and-subscribe protocol. Optionally, the plurality of data publishing terminals comprise a mobile terminal and a stationary terminal. Optionally, the mobile terminal is configured to publish the data in real time.

Figure 1:
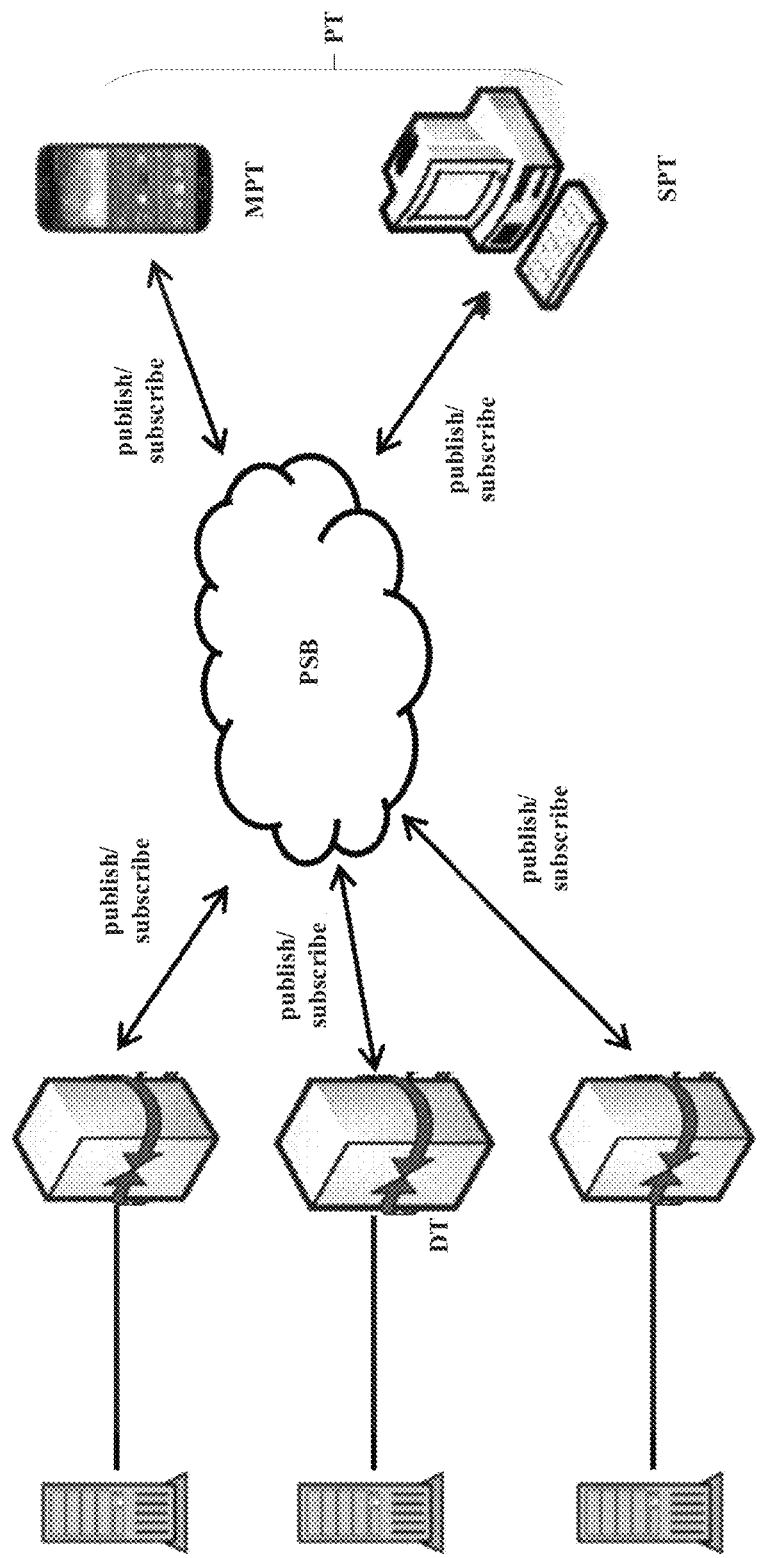
FIG. 1 is a schematic diagram illustrating a data push system in some embodiments according to the present disclosure.

FIG. 1 is a schematic diagram illustrating a data push system in some embodiments according to the present disclosure. Referring to FIG. 1, the data push method in some embodiments includes a cloud-based data distribution broker PSB configured to implement a publish-and-subscribe protocol. Examples of publish-and-subscribe protocol include a Message Queue Telemetry Transport (MQTT) publish-and-subscribe protocol. MQTT is a lightweight client/server messaging protocol based on a publish-and-subscribe interaction rather than client-request and server-deliver model. Under the publish-and-subscribe model, a client publishes information to the cloud-based data distribution broker PSB. The information published by a client is identified under one of a number of 'topics,' and other clients subscribe to the relevant topic and receive the information from the broker when the information is newly published or updated. Utilizing this publish-and-subscribe model, clients are able to publish data items they "know about," and clients are able to subscribe to data "known about" by other clients. In particular, the clients can subscribe specifically to those "topics" that are relevant to their own operation.

Referring to FIG. 1, the clients in the publish-and-subscribe model may include a plurality of data publishing terminals PT, and a plurality of device terminals DT. In one example, the plurality of data publishing terminals PT are clients that publish data to the MQTT broker, and the plurality of device terminals DT are clients that subscribe to the data. However, the plurality of data publishing terminals PT are not limited to data-publishing clients, and the plurality of device terminals DT are not limited to data-subscribing clients. Referring to FIG. 1, the plurality of data publishing terminals PT may subscribe to "topics" relevant to their own operation, and the plurality of device terminals DT may also publish data items that they "know about." In one example, the plurality of data publishing terminals PT includes a mobile terminal MPT (e.g., a smart phone) and a stationary terminal SPT (e.g., a desktop computer).

In some embodiments, the plurality of data publishing terminals PT are data generating units. Examples of data generating units include automatic data generating units and manual data generating units. Examples of manual data generating units include the mobile terminal MPT and the stationary terminal SPT. Manual data generating units include a user interface for inputting data. Examples of automatic data generating units include active data generating units and passive data generating units. Examples of active data generating units include various sensors and detectors, e.g., temperature sensors, pressure sensors, humidity sensors, cameras, and closed-circuit television. Examples of passive data generating units include radio-frequency identification readers.

Figure 2:
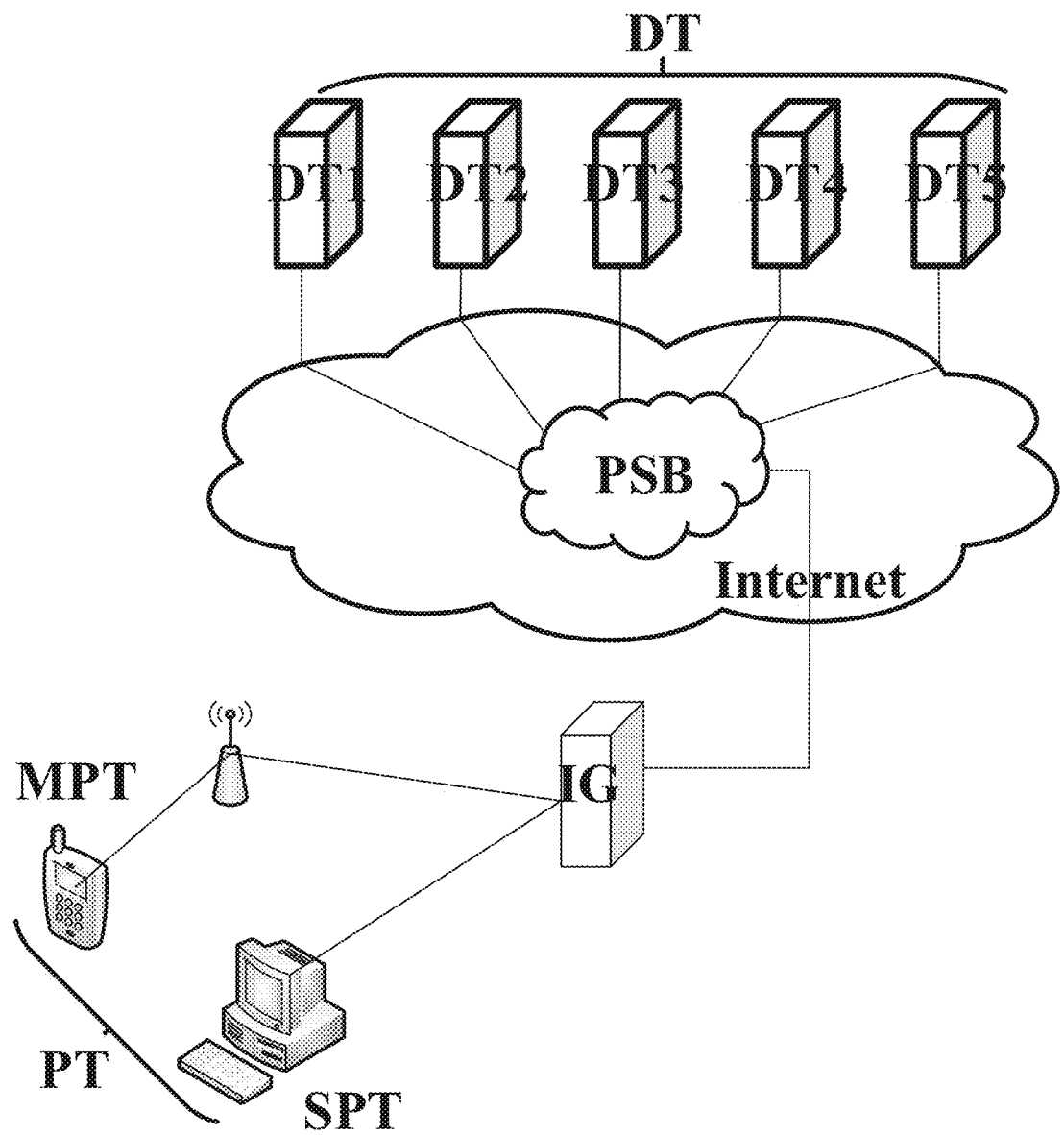
FIG. 2 is a schematic diagram of a data push system in some embodiments according to the present disclosure.

FIG. 2 is a schematic diagram of a data push system in some embodiments according to the present disclosure. Referring to FIG. 2, the data push method in some embodiments include publishing data by at least one of a plurality of data publishing terminals PT; communicating an intelligent gateway IG with the plurality of data publishing terminals PT to monitor data publishing status of the plurality of data publishing terminals PT; communicating the intelligent gateway IG with a cloud-based data distribution broker PSB configured to implement a publish-and-subscribe protocol via internet to transmit data published by the plurality of data publishing terminals PT to the cloud-based data distribution broker PSB via the publish-and-subscribe protocol; and performing a controllable operation by one or more of a plurality of device terminals DT based on the data transmitted to the one or more of a plurality of device terminals DT. Optionally, the plurality of data publishing terminals PT include a mobile terminal MPT and a stationary terminal SPT. The mobile terminal MPT is configured to publish the data in real time.

In some embodiments, the cloud-based data distribution broker PSB includes a message proxy server. Optionally, the intelligent gateway IG is configured to transmit the data published by the plurality of data publishing terminals to a message proxy server of the cloud-based data distribution broker PSB via the publish-and-subscribe protocol. Examples of intelligent gateways include various edge computing gateways, such as the Hewlett Packard Enterprise EL20, the Intel DK300, and Dell IoT Gateway 5500. Examples of message proxy server include Apache ActiveMQ (The Apache Software Foundation), mosquito, moquette, and emqttd.

Figure 3:
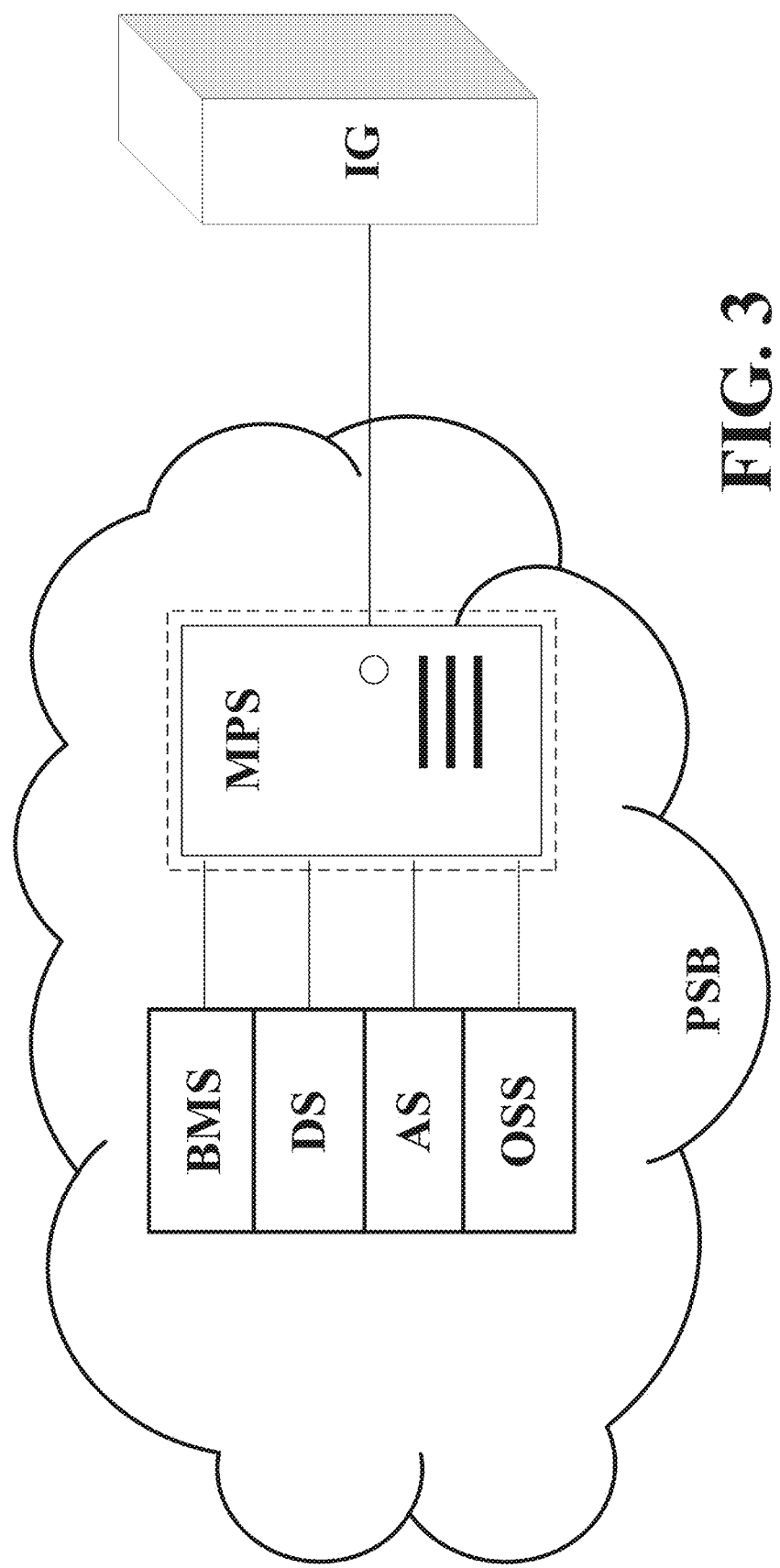
FIG. 3 is a schematic diagram illustrating the structure of a cloud-based data distribution broker in some embodiments according to the present disclosure.

FIG. 3 is a schematic diagram illustrating the structure of a cloud-based data distribution broker in some embodiments according to the present disclosure. Referring to FIG. 3, in some embodiments, the cloud-based data distribution broker PSB includes the message proxy server include MPS, and further includes at least one of a background management system BMS, a database server DS, an application server AS, or an object storage server OSS. The background management system BMS manages various databases and servers. In one example, the background management system BMS is configured to manage the configuration of the cloud-based data distribution broker PSB, for example, the configuration of the message proxy server MPS. In another example, the background management system BMS configures the IP address of the message proxy server include MPS and a registered proxy mode of the message proxy server include MPS. The database server DS is configured to run a database and store metadata. In one example, the database is a MySQL database, and the database server DS is configured to run the MySQL database. The application server AS is configured to provide various business logics to client applications through various protocols, and provide access to the business logics for the client applications' use. In one example, the application server AS is configured to implement functions including device list, recharging service, map service, SMS service, and domain name service. The object storage server OSS is configured to store and process discrete units.

In one example, the intelligent gateway IG monitors the data publishing status of the plurality of data publishing terminals PT, receives the data transmitted from one or more of the plurality of data publishing terminals PT, filters and checks the request. The application server AS is configured to process and store the data, for example, saving metadata in the database servers DS and saving multimedia data in the object storage server OSS. In another example, the application server AS is configured to push the data to a message push server, which in turn pushes the data to one or more of the plurality of device terminals DT.

Figure 4:
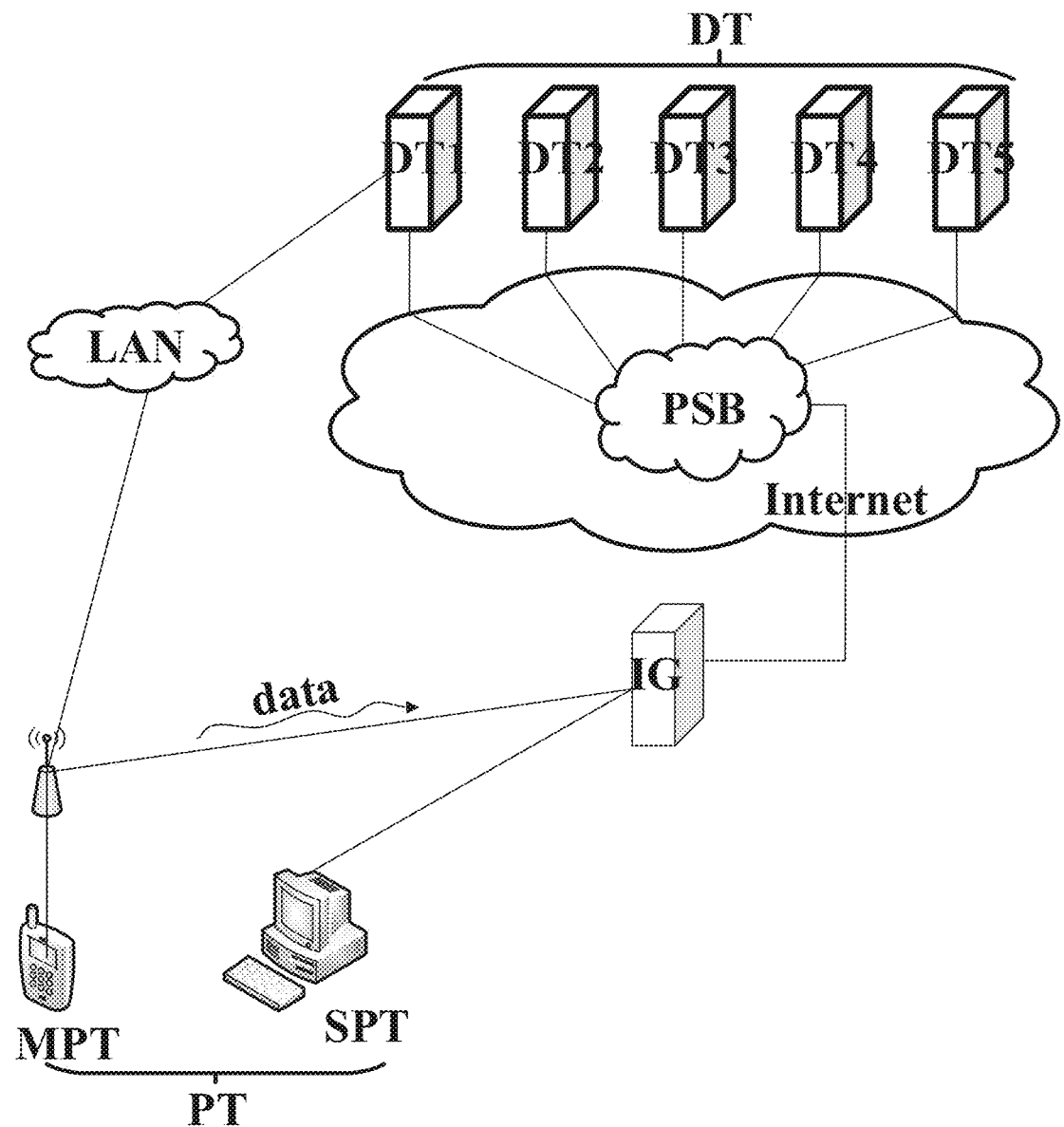
FIG. 4 is a schematic diagram of a data push method in some embodiments according to the present disclosure.

FIG. 4 is a schematic diagram of a data push method in some embodiments according to the present disclosure. Referring to FIG. 4, the data push method in some embodiments includes transmitting the data to the intelligent gateway IG. The intelligent gateway IG is configured to determine whether the data is published by the mobile terminal MPT. When the intelligent gateway IG determines that the data is published by the mobile terminal MPT, the intelligent gateway IG is further configured to determine whether the mobile terminal MPT and a selected device terminal of the plurality of device terminals DT are connected to a same local area network. As shown in FIG. 4, in one example, a first device terminal DT1 of the plurality of device terminals DT and the mobile terminal MPT are connected to the same local area network (depicted as LAN in FIG. 4). Based on a determination that the mobile terminal MPT and the selected device terminal are connected to the same local area network, the intelligent gateway IG instructs the mobile terminal MPT to transmit the data from the mobile terminal MPT directly to the selected device terminal (in this case, the first device terminal DT1) via the same local area network LAN, without going through the cloud-based data distribution broker PSB.

By configuring the intelligent gateway IG to determine whether the data is published by the mobile terminal MPT and whether the mobile terminal MPT and the selected device terminal of the plurality of device terminals DT are connected to a same local area network, the present method can greatly expedite the transmission of the data. The present method provides flexibility and efficiency to the data push process.

Figure 5:
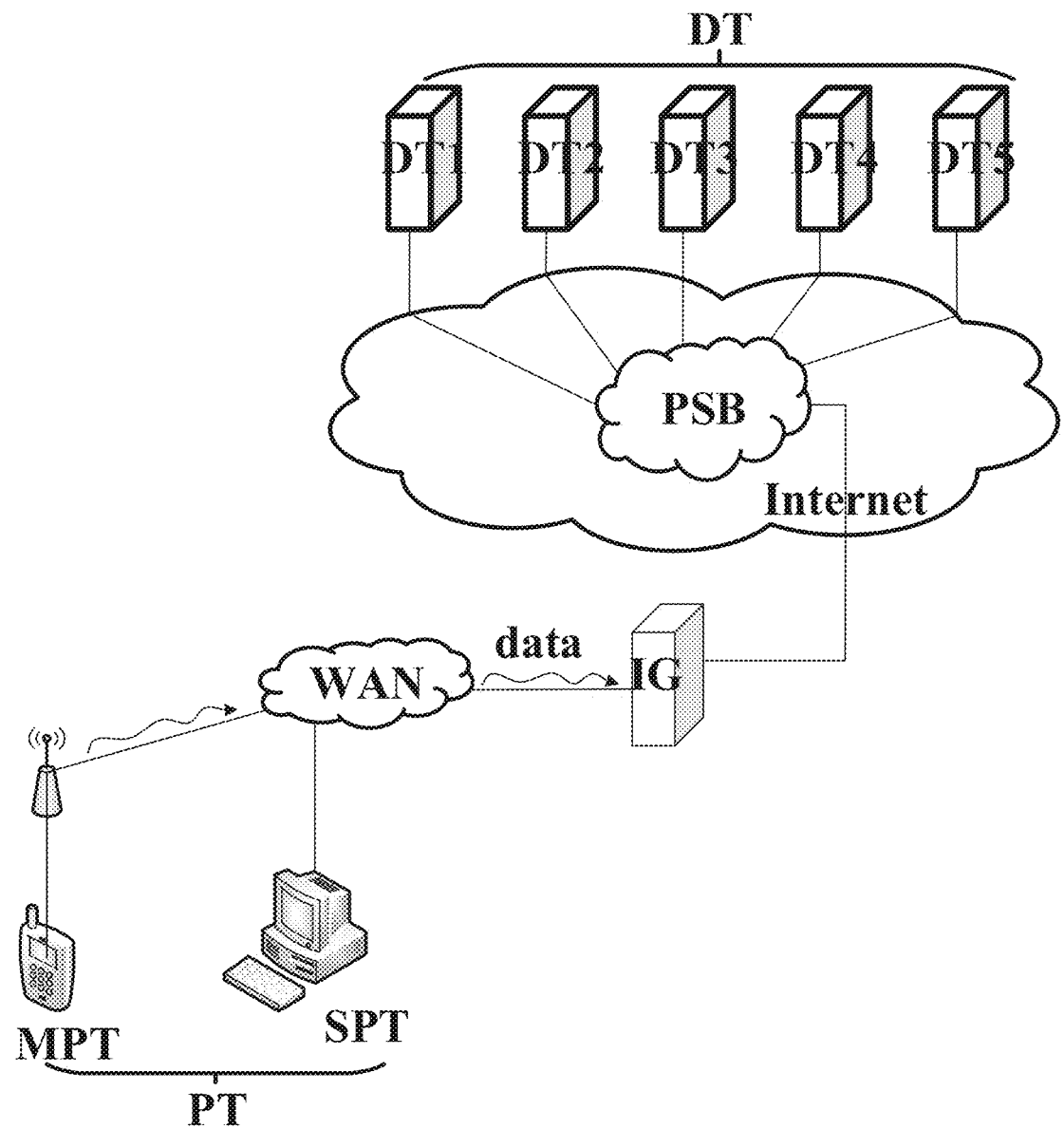
FIG. 5 is a schematic diagram of a data push method in some embodiments according to the present disclosure.

FIG. 5 is a schematic diagram of a data push method in some embodiments according to the present disclosure. Referring to FIG. 5, the data push method in some embodiments includes transmitting the data to the intelligent gateway IG. The intelligent gateway IG is configured to determine whether the data is published by the mobile terminal MPT. When the intelligent gateway IG determines that the data is published by the mobile terminal MPT, the intelligent gateway IG is further configured to determine whether the mobile terminal MPT and a selected device terminal of the plurality of device terminals DT are connected to a same local area network. As shown in FIG. 5, in one example, none of the plurality of device terminals DT is connected to a same local area network as the mobile terminal MPT. For example, the mobile terminal MPT and all of the plurality of device terminals DT are connected through a wide area network WAN. Based on a determination that the mobile terminal MPT and the selected device terminal (in this case, any one of the plurality of device terminals DT) are not connected to the same local area network, the intelligent gateway IG is configured to transmit the data from the intelligent gateway IG to the message proxy server MPS (see FIG. 3) via the publish-and-subscribe protocol.

By configuring the intelligent gateway IG to determine whether the terminal publishing the data and the selected device terminal of the plurality of device terminals are connected to a same local area network, the present data push method enables an option of pushing data using the cloud-based data distribution broker PSB via the publish-and-subscribe protocol. The cloud-based data distribution broker PSB makes it possible to push data even if one or more of the plurality of device terminals DT are in a poor network environment, thereby avoiding delay and information loss.

Figure 6:
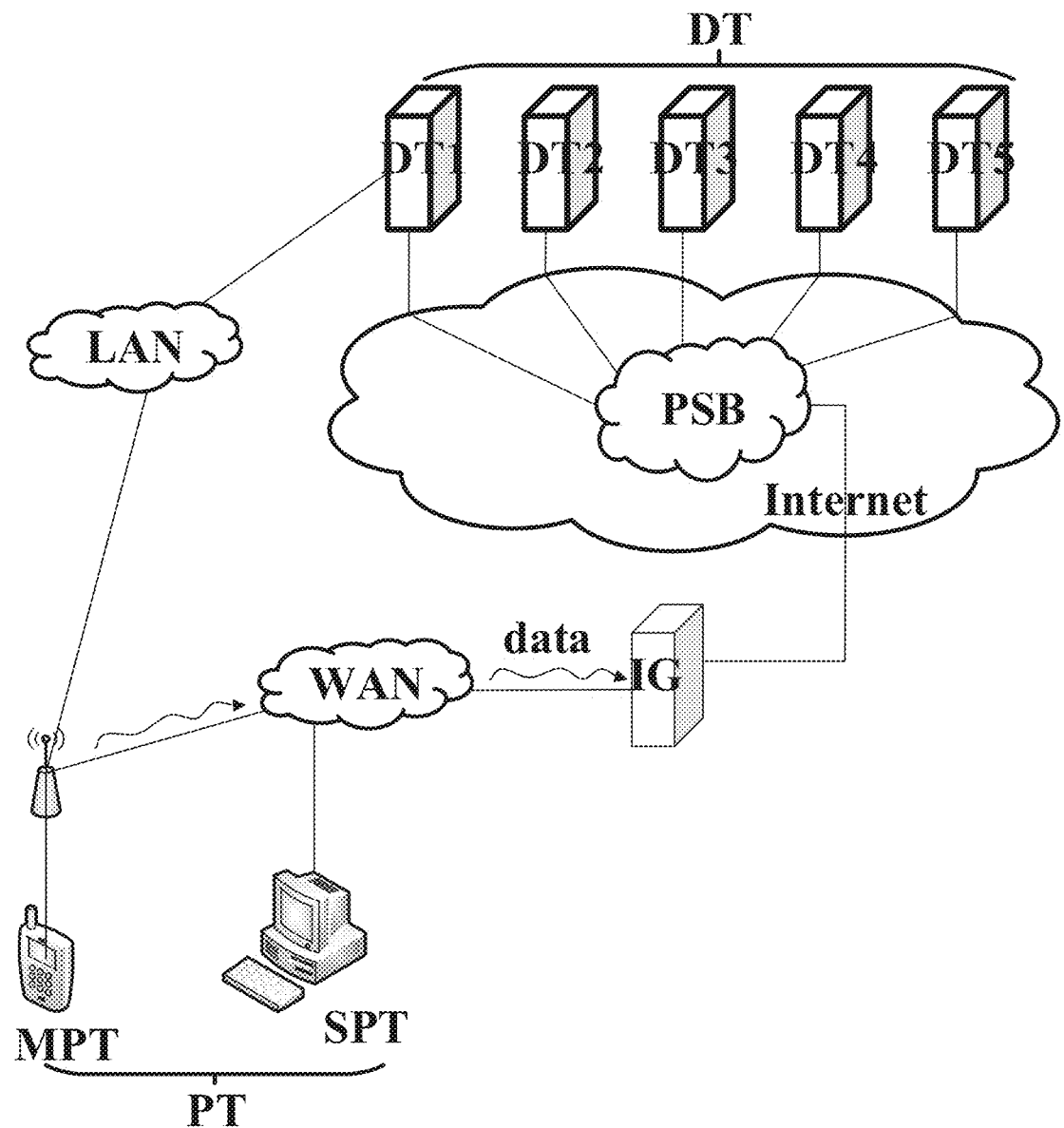
FIG. 6 is a schematic diagram of a data push method in some embodiments according to the present disclosure.

FIG. 6 is a schematic diagram of a data push method in some embodiments according to the present disclosure. Referring to FIG. 5, the data push method in some embodiments includes transmitting the data to the intelligent gateway IG. The intelligent gateway IG is configured to determine whether the data is published by the mobile terminal MPT. When the intelligent gateway IG determines that the data is published by the mobile terminal MPT, the intelligent gateway IG is further configured to determine whether the mobile terminal MPT and a selected device terminal of the plurality of device terminals DT are connected to a same local area network. Optionally, the intelligent gateway IG is further configured to determine one or more device terminals of the plurality of device terminals DT that subscribe to a topic published by the mobile terminal MPT. In one example, the intelligent gateway IG determines that a first device terminal DT1 and a second device terminal DT2 of the plurality of device terminals DT subscribe to the topic. In another example, the intelligent gateway IG determines that the first device terminal DT1 and the mobile terminal MPT are connected to the same local area network (depicted as LAN in FIG. 6), and the second device terminal DT2 and the mobile terminal MPT are not connected to the same local area network. In some embodiments, based on a determination that the mobile terminal NPT and a first selected device terminal (in this case, the first device terminal DT1) of the plurality of device terminals DT are connected to the same local area network (depicted as LAN in FIG. 6), the intelligent gateway IG instructs the mobile terminal MPT to transmit the data from the mobile terminal MPT directly to the selected device terminal (in this case, the first device terminal DT1) via the same local area network LAN, without going through the cloud-based data distribution broker PSB. In some embodiments, based on a determination that the mobile terminal MPT and a second selected device terminal (in this case, the second device terminal DT2) of the plurality of device terminals DT are not connected to the same local area network, the intelligent gateway IG is configured to transmit the data from the intelligent gateway IG to the message proxy server MPS (see FIG. 3) via the publish-and-subscribe protocol; and the cloud-based data distribution broker PSB pushes the data to the second selected device terminal (in this case, the second device terminal DT2).

Figure 7:
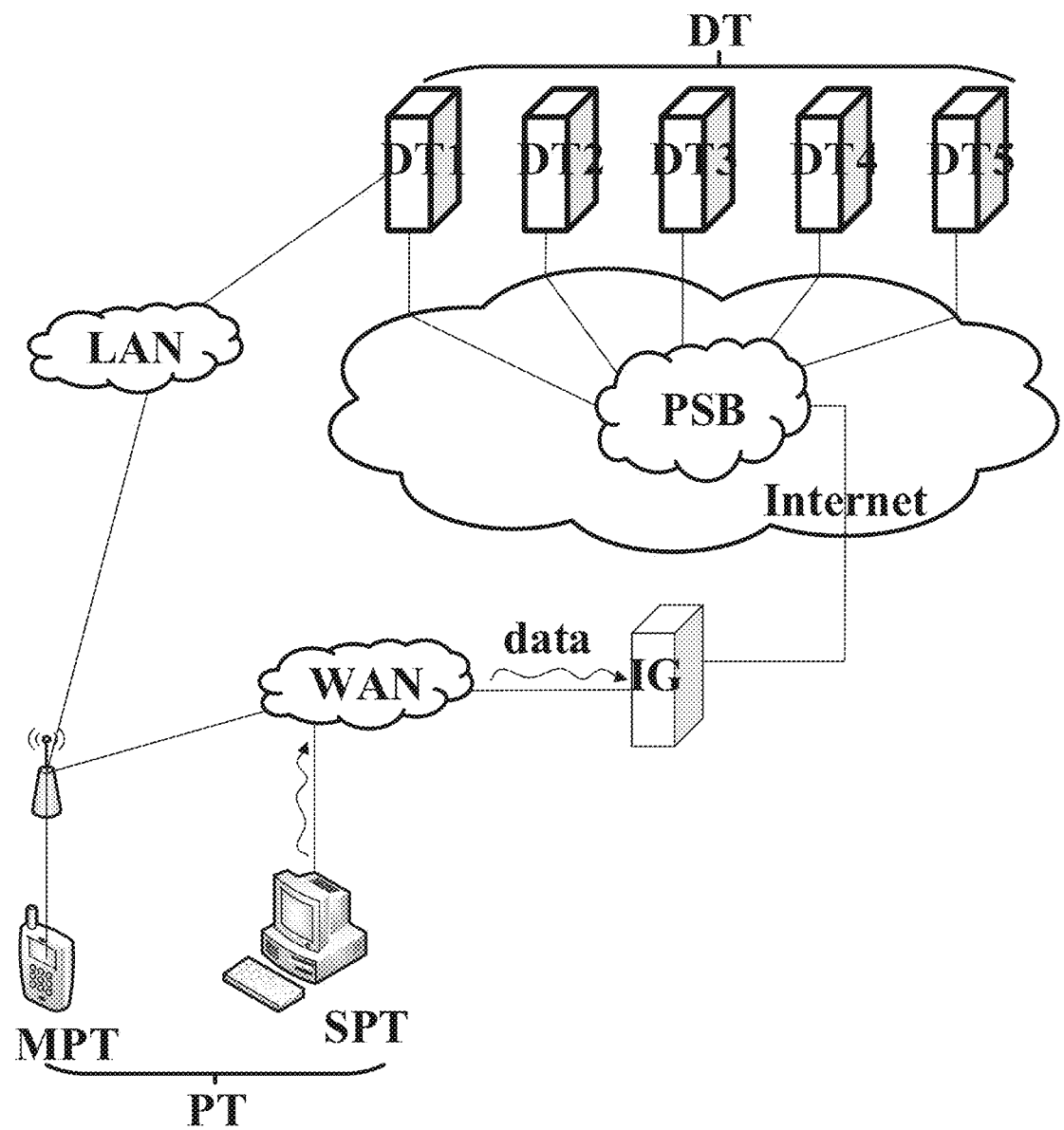
FIG. 7 is a schematic diagram of a data push method in some embodiments according to the present disclosure.

FIG. 7 is a schematic diagram of a data push method in some embodiments according to the present disclosure. Referring to FIG. 7, the data push method in some embodiments includes transmitting the data to the intelligent gateway IG. The intelligent gateway IG is configured to determine whether the data is published by the stationary terminal SPT. When the intelligent gateway IG determines that the data is published by the stationary terminal SPT, the intelligent gateway IG is further configured to transmit the data from the intelligent gateway IG to the message proxy server MPS (see FIG. 3) via the publish-and-subscribe protocol, and push the data to a selected device terminal of the plurality of device terminals DT.

Examples of mobile terminals include a smart phone, a tablet computer, a handheld portable device, a wearable smart device (e.g., a smart watch), a laptop computer, a notebook computer, a navigation device, and personal digital assistant. Examiners of stationary terminals include a desktop computer, a television, a digital signage, and a monitor.

In another aspect, the present disclosure provides a data push system. In some embodiments, the data push system includes a cloud-based data distribution broker configured to implement a publish-and-subscribe protocol; a plurality of data publishing terminals configured to publish data; an intelligent gateway configured to communicate with the plurality of data publishing terminals and monitor data publishing status of the plurality of data publishing terminals, and configured to communicate with the cloud-based data distribution broker via internet, to transmit data published by the plurality of data publishing terminals to the cloud-based data distribution broker via the publish-and-subscribe protocol; and a plurality of device terminals configured to perform a controllable operation based on the data transmitted to one or more of a plurality of device terminals. Optionally, the cloud-based data distribution broker includes a message proxy server, a background management system, a database server, an application server, and an object storage server. Optionally, the intelligent gateway is configured to transmit the data published by the plurality of data publishing terminals to the message proxy server via the publish-and-subscribe protocol. Optionally, the plurality of data publishing terminals includes a mobile terminal and a stationary terminal. Optionally, the mobile terminal is configured to publish the data in real time.

In some embodiments, the intelligent gateway is configured to determine whether a data received by the intelligent gateway is published by the mobile terminal; and determine, based on a determination that the data is published by the mobile terminal, whether the mobile terminal and a selected device terminal of the plurality of device terminals are connected to a same local area network. Optionally, the mobile terminal is configured to, based on a determination that the mobile terminal and the selected device terminal are connected to the same local area network, transmit the data from the mobile terminal to the selected device terminal via the same local area network.

In some embodiments, the intelligent gateway is configured to determine whether a data received by the intelligent gateway is published by the mobile terminal; determine, based on a determination that the data is published by the mobile terminal, whether the mobile terminal and a selected device terminal of the plurality of device terminals are connected to a same local area network; and transmit, based on a determination that the mobile terminal and the selected device terminal are not connected to the same local area network, the data from the intelligent gateway to the message proxy server via the publish-and-subscribe protocol. Optionally, the cloud-based data distribution broker is configured to push the data to the selected device terminal.

In some embodiments, the intelligent gateway is configured to determine whether a data received by the intelligent gateway is published by the mobile terminal; and determine, based on a determination that the data is published by the mobile terminal, whether the mobile terminal and the plurality of device terminals are connected to a same local area network. Optionally, the mobile terminal is configured to, based on a determination that the mobile terminal and a first selected device terminal of the plurality of device terminals are connected to the same local area network, transmit the data from the mobile terminal to the selected device terminal via the same local area network. Optionally, the gateway is further configured to transmit, based on a determination that the mobile terminal and a second selected device terminal of the plurality of device terminals are not connected to the same local area network, the data from the intelligent gateway to the message proxy server via the publish-and-subscribe protocol. Optionally, the cloud-based data distribution broker is configured to push the data to the second selected device terminal.

In some embodiments, the intelligent gateway is configured to determine whether a data received by the intelligent gateway is published by the stationary terminal; and transmit, based on a determination that the data is published by the stationary terminal, the data from the intelligent gateway to the message proxy server via the publish-and-subscribe protocol. Optionally, the cloud-based data distribution broker is configured to push the data to the selected device terminal.

In some embodiments, the publish-and-subscribe protocol is a Message Queue Telemetry Transport (MQTT) publish-and-subscribe protocol. Optionally, the message proxy server is a MQTT message proxy server.

In another aspect, the present disclosure provides a computer-program product comprising a non-transitory tangible computer-readable medium having computer-readable instructions thereon. In some embodiments, the computer-readable instructions being executable by a processor to cause the processor to perform causing an intelligent gateway in communication with a plurality of data publishing terminals to monitor data publishing status of the plurality of data publishing terminals, the intelligent gateway in communication with a cloud-based data distribution broker configured to implement a publish-and-subscribe protocol; causing the intelligent gateway to transmit via internet data published by at least one of the plurality of data publishing terminals to the cloud-based data distribution broker via the publish-and-subscribe protocol. Optionally, the cloud-based data distribution broker comprises a message proxy server, a background management system, a database server, an application server, and an object storage server. Optionally, the intelligent gateway is configured to transmit the data published by the plurality of data publishing terminals to the message proxy server via the publish-and-subscribe protocol. Optionally, the plurality of data publishing terminals comprise a mobile terminal and a stationary terminal. Optionally, the mobile terminal is configured to publish the data in real time.

In some embodiments, the computer-readable instructions being executable by the processor to cause the processor to further perform determining whether the data received by the intelligent gateway is published by the mobile terminal; based on a determination that the data is published by the mobile terminal, determining whether the mobile terminal and a selected device terminal of the plurality of device terminals are connected to a same local area network; and based on a determination that the mobile terminal and the selected device terminal are connected to the same local area network, causing the mobile terminal to transmit the data to the selected device terminal via the same local area network.

In some embodiments, the computer-readable instructions being executable by the processor to cause the processor to further perform determining whether the data received by the intelligent gateway is published by the mobile terminal; based on a determination that the data is published by the mobile terminal, determining whether the mobile terminal and a selected device terminal of the plurality of device terminals are connected to a same local area network; based on a determination that the mobile terminal and the selected device terminal are not connected to the same local area network, transmitting the data from the intelligent gateway to the message proxy server via the publish-and-subscribe protocol; and pushing the data to the selected device terminal.

In some embodiments, the computer-readable instructions being executable by the processor to cause the processor to further perform determining whether the data received by the intelligent gateway is published by the mobile terminal; based on a determination that the data is published by the mobile terminal, determining whether the mobile terminal and the plurality of device terminals are connected to a same local area network; based on a determination that the mobile terminal and a first selected device terminal of the plurality of device terminals are connected to the same local area network, transmitting the data from the mobile terminal to the selected device terminal via the same local area network; based on a determination that the mobile terminal and a second selected device terminal of the plurality of device terminals are not connected to the same local area network, transmitting the data from the intelligent gateway to the message proxy server via the publish-and-subscribe protocol; and pushing the data to the second selected device terminal.

In some embodiments, the computer-readable instructions being executable by the processor to cause the processor to further perform determining whether the data received by the intelligent gateway is published by the stationary terminal; based on a determination that the data is published by the stationary terminal, transmitting the data from the intelligent gateway to the message proxy server via the publish-and-subscribe protocol; and pushing the data to a selected device terminal of the plurality of device terminals.

In some embodiments, the publish-and-subscribe protocol is a Message Queue Telemetry Transport (MQTT) publish-and-subscribe protocol. Optionally, the message proxy server is a MQTT message proxy server.

Various illustrative neural networks, segments, units, channels, modules, and other operations described in connection with the configurations disclosed herein may be implemented as electronic hardware, computer software, or combinations of both. Such neural networks, segments, units, channels, modules, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), non-volatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A data push method, comprising:
   publishing data by at least one of a plurality of data publishing terminals;
   communicating an intelligent gateway with the plurality of data publishing terminals to monitor data publishing status of the plurality of data publishing terminals;
   communicating the intelligent gateway with a cloud-based data distribution broker configured to implement a publish-and-subscribe protocol via internet to transmit data published by the plurality of data publishing terminals to the cloud-based data distribution broker via the publish-and-subscribe protocol; and
   performing a controllable operation by one or more of a plurality of device terminals based on the data transmitted to the one or more of a plurality of device terminals;
   wherein the cloud-based data distribution broker comprises a message proxy server, a background management system, a database server, an application server, and an object storage server;
   the intelligent gateway is configured to transmit the data published by the plurality of data publishing terminals to the message proxy server via the publish-and-subscribe protocol;
   the plurality of data publishing terminals comprise a mobile terminal and a stationary terminal; and
   the mobile terminal is configured to publish the data in real time;
   wherein the data push method further comprises:
   transmitting the data from the plurality of data publishing terminals to the intelligent gateway; and
   determining, by the intelligent gateway, whether the data is published by the mobile terminal or by the stationary terminal.

2. The data push method of claim 1, further comprising:
   based on a determination that the data is published by the mobile terminal, determining, by the intelligent gateway, whether the mobile terminal and a selected device terminal of the plurality of device terminals are connected to a same local area network;
   based on a determination that the mobile terminal and the selected device terminal are connected to the same local area network, transmitting the data from the mobile terminal to the selected device terminal via the same local area network.

3. The data push method of claim 1, further comprising:
   based on a determination that the data is published by the mobile terminal, determining, by the intelligent gateway, whether the mobile terminal and a selected device terminal of the plurality of device terminals are connected to a same local area network;
   based on a determination that the mobile terminal and the selected device terminal are not connected to the same local area network, transmitting the data from the intelligent gateway to the message proxy server via the publish-and-subscribe protocol; and
   pushing the data to the selected device terminal.

4. The data push method of claim 1, further comprising:
   based on a determination that the data is published by the mobile terminal, determining, by the intelligent gateway, whether the mobile terminal and the plurality of device terminals are connected to a same local area network;
   based on a determination that the mobile terminal and a first selected device terminal of the plurality of device terminals are connected to the same local area network, transmitting the data from the mobile terminal to the first selected device terminal via the same local area network;
   based on a determination that the mobile terminal and a second selected device terminal of the plurality of device terminals are not connected to the same local area network, transmitting the data from the intelligent gateway to the message proxy server via the publish-and-subscribe protocol; and
   pushing the data to the second selected device terminal.

5. The data push method of claim 1, further comprising:
   based on a determination that the data is published by the stationary terminal, transmitting the data from the intelligent gateway to the message proxy server via the publish-and-subscribe protocol; and
   pushing the data to a selected device terminal of the plurality of device terminals.

6. The data push method of claim 1, wherein the publish-and-subscribe protocol is a Message Queue Telemetry Transport (MQTT) publish-and-subscribe protocol; and
   the message proxy server is a MQTT message proxy server.

7. The data push method of claim 1, wherein the background management system is configured to manage configuration of the message proxy server, including an IP address of the message proxy server and a registered proxy mode of the message proxy server;
   the application server is configured to process and store the data, and is configured to push the data to a message push server.

8. A data push system, comprising:
   a cloud-based data distribution broker configured to implement a publish-and-subscribe protocol;
   a plurality of data publishing terminals configured to publish data;
   an intelligent gateway configured to communicate with the plurality of data publishing terminals and monitor data publishing status of the plurality of data publishing terminals, and configured to communicate with the cloud-based data distribution broker via internet, to transmit data published by the plurality of data publishing terminals to the cloud-based data distribution broker via the publish-and-subscribe protocol; and a plurality of device terminals configured to perform a controllable operation based on the data transmitted to one or more of a plurality of device terminals;

wherein the cloud-based data distribution broker comprises a message proxy server, a background management system, a database server, an application server, and an object storage server;

the intelligent gateway is configured to transmit the data published by the plurality of data publishing terminals to the message proxy server via the publish-and-subscribe protocol;

the plurality of data publishing terminals comprise a mobile terminal and a stationary terminal; and the mobile terminal is configured to publish the data in real time;

wherein the plurality of data publishing terminals is further configured to transmit the data to the intelligent gateway; and the intelligent gateway is further configured to determine whether a data received by the intelligent gateway is published by the mobile terminal or by the stationary terminal.

9. The data push system of claim 8, wherein the intelligent gateway is configured to:
determine, based on a determination that the data is published by the mobile terminal, whether the mobile terminal and a selected device terminal of the plurality of device terminals are connected to a same local area network;
wherein the mobile terminal is configured to, based on a determination that the mobile terminal and the selected device terminal are connected to the same local area network, transmit the data from the mobile terminal to the selected device terminal via the same local area network.

10. The data push system of claim 8, wherein the intelligent gateway is configured to:
determine, based on a determination that the data is published by the mobile terminal, whether the mobile terminal and a selected device terminal of the plurality of device terminals are connected to a same local area network; and
transmit, based on a determination that the mobile terminal and the selected device terminal are not connected to the same local area network, the data from the intelligent gateway to the message proxy server via the publish-and-subscribe protocol;
wherein the cloud-based data distribution broker is configured to push the data to the selected device terminal.

11. The data push system of claim 8, wherein the intelligent gateway is configured to:
determine, based on a determination that the data is published by the mobile terminal, whether the mobile terminal and the plurality of device terminals are connected to a same local area network;
wherein the mobile terminal is configured to, based on a determination that the mobile terminal and a first selected device terminal of the plurality of device terminals are connected to the same local area network, transmit the data from the mobile terminal to the first selected device terminal via the same local area network;
wherein the intelligent gateway is further configured to transmit, based on a determination that the mobile terminal and a second selected device terminal of the plurality of device terminals are not connected to the same local area network, the data from the intelligent gateway to the message proxy server via the publish-and-subscribe protocol;
wherein the cloud-based data distribution broker is configured to push the data to the second selected device terminal.

12. The data push system of claim 8, wherein the intelligent gateway is configured to:
transmit, based on a determination that the data is published by the stationary terminal, the data from the intelligent gateway to the message proxy server via the publish-and-subscribe protocol;
wherein the cloud-based data distribution broker is configured to push the data to a selected device terminal.

13. The data push system of claim 8, wherein the publish-and-subscribe protocol is a Message Queue Telemetry Transport (MQTT) publish-and-subscribe protocol; and
the message proxy server is a MQTT message proxy server.

14. The data push system of claim 8, wherein the background management system is configured to manage configuration of the message proxy server, including an IP address of the message proxy server and a registered proxy mode of the message proxy server;
the application server is configured to process and store the data, and is configured to push the data to a message push server.

15. A computer-program product comprising a non-transitory tangible computer-readable medium having computer-readable instructions thereon, the computer-readable instructions being executable by a processor to cause the processor to perform:
causing an intelligent gateway in communication with a plurality of data publishing terminals to monitor data publishing status of the plurality of data publishing terminals, the intelligent gateway in communication with a cloud-based data distribution broker configured to implement a publish-and-subscribe protocol; and
causing the intelligent gateway to transmit via internet data published by at least one of the plurality of data publishing terminals to the cloud-based data distribution broker via the publish-and-subscribe protocol;
wherein the cloud-based data distribution broker comprises a message proxy server, a background management system, a database server, an application server, and an object storage server;
the intelligent gateway is configured to transmit the data published by the at least one of the plurality of data publishing terminals to the message proxy server via the publish-and-subscribe protocol;
the plurality of data publishing terminals comprise a mobile terminal and a stationary terminal; and
the mobile terminal is configured to publish the data in real time;
wherein the computer-readable instructions being executable by the processor to cause the processor to further perform:
causing the plurality of data publishing terminals to transmit the data to the intelligent gateway; and
causing the intelligent gateway to determine whether the data received by the intelligent gateway is published by the mobile terminal or by the stationary terminal.

16. The computer-program product of claim 15, wherein the computer-readable instructions being executable by the processor to cause the processor to further perform:

causing the intelligent gateway to determine, based on a determination that the data is published by the mobile terminal, whether the mobile terminal and a selected device terminal of a plurality of device terminals are connected to a same local area network; and based on a determination that the mobile terminal and the selected device terminal are connected to the same local area network, causing the mobile terminal to transmit the data to the selected device terminal via the same local area network.

17. The computer-program product of claim 15, wherein the computer-readable instructions being executable by the processor to cause the processor to further perform:

causing the intelligent gateway to determine, based on a determination that the data is published by the mobile terminal, whether the mobile terminal and a selected device terminal of a plurality of device terminals are connected to a same local area network;

based on a determination that the mobile terminal and the selected device terminal are not connected to the same local area network, transmitting the data from the intelligent gateway to the message proxy server via the publish-and-subscribe protocol; and pushing the data to the selected device terminal.

18. The computer-program product of claim 15, wherein the computer-readable instructions being executable by the processor to cause the processor to further perform:

causing the intelligent gateway to determine, based on a determination that the data is published by the mobile terminal, whether the mobile terminal and a plurality of device terminals are connected to a same local area network;

based on a determination that the mobile terminal and a first selected device terminal of the plurality of device terminals are connected to the same local area network, transmitting the data from the mobile terminal to the first selected device terminal via the same local area network;

based on a determination that the mobile terminal and a second selected device terminal of the plurality of device terminals are not connected to the same local area network, transmitting the data from the intelligent gateway to the message proxy server via the publish-and-subscribe protocol; and pushing the data to the second selected device terminal.

19. The computer-program product of claim 15, wherein the computer-readable instructions being executable by the processor to cause the processor to further perform:

causing the intelligent gateway to transmit, based on a determination that the data is published by the stationary terminal, the data from the intelligent gateway to the message proxy server via the publish-and-subscribe protocol; and pushing the data to a selected device terminal of a plurality of device terminals.

20. The computer-program product of claim 15, wherein the publish-and-subscribe protocol is a Message Queue Telemetry Transport (MQTT) publish-and-subscribe protocol; and the message proxy server is a MQTT message proxy server.

* * * * *